United States Patent
Bhyravabhotla

(10) Patent No.: US 6,411,196 B1
(45) Date of Patent: Jun. 25, 2002

(54) SYSTEM AND METHOD OF CONTROLLING AN ELECTRONIC PRICE LABEL

(75) Inventor: Raghurama Bhyravabhotla, Duluth, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/205,741

(22) Filed: Dec. 4, 1998

(51) Int. Cl.⁷ .................................................. G06F 7/12
(52) U.S. Cl. ..................................... 340/5.91; 714/812
(58) Field of Search .................................. 340/5.91, 3.7; 235/383; 705/16, 20; 709/211; 714/812, 811, 48

(56) References Cited

U.S. PATENT DOCUMENTS

| | | |
|---|---|---|
| 4,002,886 A | 1/1977 | Sundelin |
| 4,500,880 A | 2/1985 | Gomersall et al. |
| 4,924,363 A | 5/1990 | Kornelson |
| 5,172,314 A | 12/1992 | Poland et al. |
| 5,448,226 A | 9/1995 | Failing, Jr. et al. |
| 6,035,437 A * | 3/2000 | Adamec ...................... 714/812 |
| 6,047,263 A * | 4/2000 | Goodwin, II ................. 705/20 |
| 6,211,773 B1 * | 4/2001 | Adamec et al. ............. 340/5.91 |
| 6,311,308 B1 * | 10/2001 | Adamec ...................... 714/811 |

* cited by examiner

Primary Examiner—Edwin C. Holloway, III
(74) Attorney, Agent, or Firm—Paul W. Martin

(57) ABSTRACT

A system and method of controlling an electronic price label (EPL) through infra-red signals instead of push-button signals. The system includes a computer which transmits wireless radio frequency messages containing functions codes and instructions, and a portable terminal which emits infra-red signals containing at least one of the function codes. The EPL receives the radio frequency messages, stores the function codes and corresponding instructions in a memory within the EPL, receives the infra-red signals from the portable terminal, determines the instructions associated with the function codes received from the portable terminal, and executes the determined instructions.

8 Claims, 3 Drawing Sheets

SYSTEM AND METHOD OF CONTROLLING AN ELECTRONIC PRICE LABEL

BACKGROUND OF THE INVENTION

The present invention relates to electronic price label (EPL) systems, and more specifically to a system and method of controlling an EPL.

EPL systems typically include a plurality of EPLs for merchandise items in a transaction establishment. EPLs typically display the price of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file and stored within an EPL price change record.

Diagnostic and other functions must be performed by store personnel. Store personnel typically activate such functions locally. Some EPLs include push-button switches for this purpose. However, the push-button switches must be protected against customer activation. The push-button switches must be hidden from view or covered by a plastic casing.

Therefore, it would be desirable to provide a system and method of controlling an EPL which does not employ a push-button switch.

SUMMARY OF THE INVENTION

In accordance with the teachings of the present invention, a system and method of controlling an electronic price label (EPL) is provided.

The system includes a computer which transmits wireless radio frequency messages containing functions codes and instructions, and a portable terminal which emits infra-red signals containing at least one of the function codes. The EPL receives the radio frequency messages, stores the function codes and corresponding instructions in a memory within the EPL, receives the infra-red signals from the portable terminal, determines the instructions associated with the function codes received from the portable terminal, and executes the determined instructions.

The method of controlling an electronic price label (EPL) includes the step of receiving a wireless radio frequency signal containing a function code and a corresponding instruction from a computer by control circuitry within the EPL, storing the function code and the corresponding instruction in a memory within the EPL by the control circuitry, receiving an infra-red signal containing the function code from a portable terminal by the control circuitry, and executing the corresponding instruction by the control circuitry.

The instruction may be any command required by a local operator, such as a command for viewing contents of a number of registers within the memory, a command for changing information displayed by the EPL, and a diagnostic command.

It is accordingly an object of the present invention to provide a system and method of controlling an EPL.

It is another object of the present invention to provide a system and method of locally controlling an EPL.

It is another object of the present invention to provide a system and method of locally controlling an EPL which causes an EPL to display its memory contents to an operator.

It is another object of the present invention to provide a system and method of locally controlling an EPL which causes an EPL to perform predetermined functions.

It is another object of the present invention to provide a system and method of locally controlling an EPL which is an alternative to a system employing a push-button.

It is another object of the present invention to provide a system and method of locally controlling an EPL using an infra-red signal.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
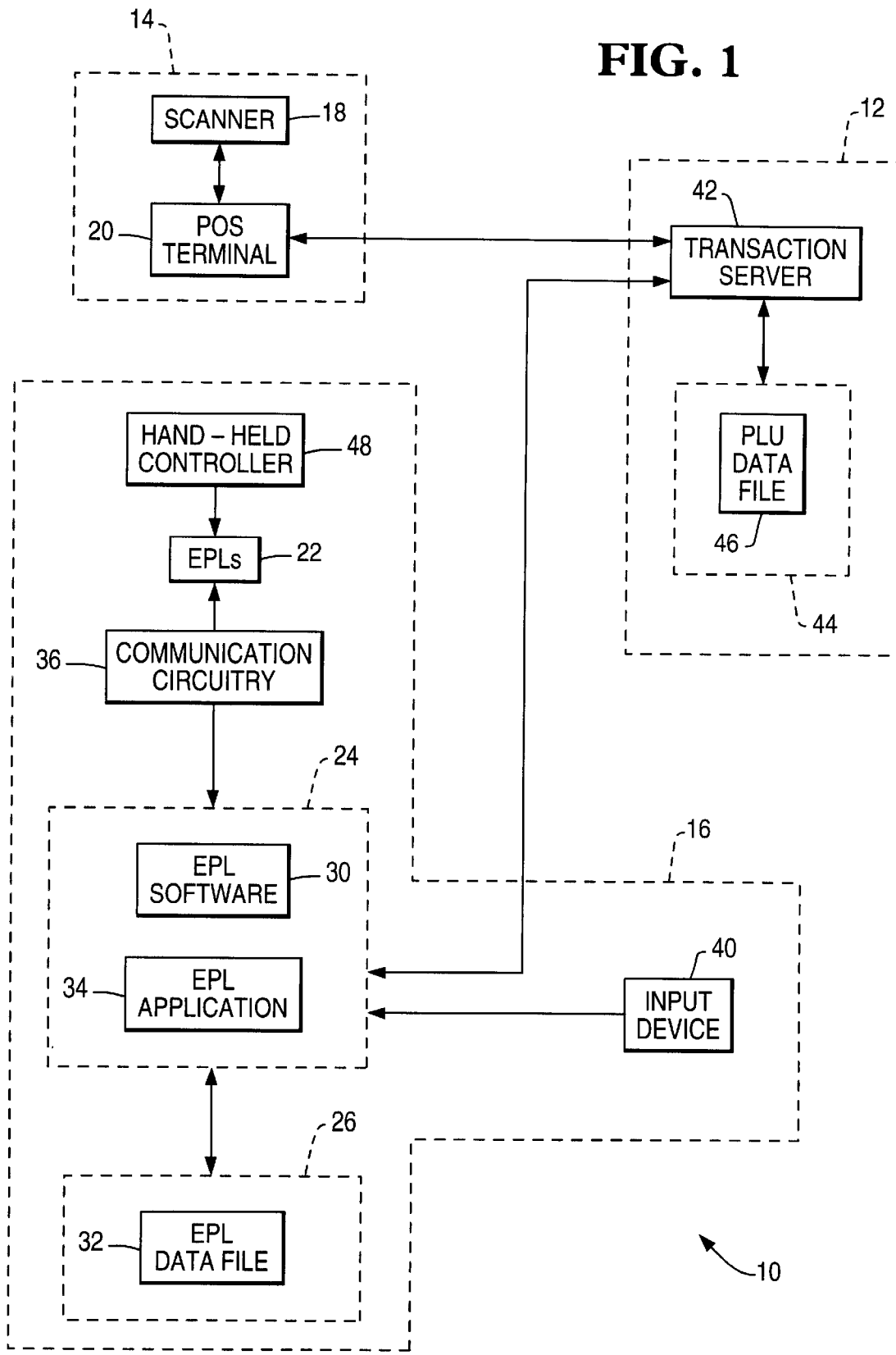
FIG. 1 is a block diagram of a transaction processing system.

Referring now to FIG. 1, transaction system 10 primarily includes host computer system 12, point-of-sale (POS) system 14, and EPL system 16. Here, components 12 and 14 are shown as separate components that are networked together, but they may also form a single component. Thus, host computer system 12 may be a POS terminal which doubles as a host computer for network of other POS terminals.

POS system 14 includes bar code reader 18 and terminal 20.

EPL system 16 primarily includes EPLs 22, host EPL computer 24, EPL storage medium 26, communication circuitry 36, and Hand-held EPL controller terminal 48.

EPLs 22 display price and other information. EPLs 22 are primarily controlled by EPL computer 24, but are also controlled by Hand-held EPL controller terminal 48.

Host EPL computer 24 executes EPL software 30. To assist with execution of certain tasks performed by EPL software 30, EPL computer 24 includes a built-in time keeping device, commonly referred to as a system clock, which is synchronized with current time, in order to automatically execute the tasks at their scheduled times.

EPL software 30 is responsible for scheduling and transmitting price data from EPL data file 32 to EPLs 22. EPL software 30 obtains prices in PLU data file 46 as they are entered in input device 40 (immediate processing) or after they have been stored within price look-up (PLU) data file 46.

EPL computer 24 also executes EPL application 34, which may be any application for managing EPL system 16.

EPL storage medium 26 stores EPL data file 32. EPL storage medium 26 and is preferably a fixed disk drive.

EPL data file 32 contains EPL identification and price checksum information. Price checksum information is calculated from price information in PLU data file 46. EPL data file 32 contains current information displayed by EPLs 22.

EPL computer 24 communicates with EPLs 22 through communication circuitry 36. Communication circuitry preferably communicates with EPLs 22 using wireless radio frequency (RF) communication.

Input device 40 is preferably a keyboard.

Hand-held EPL controller terminal 48 provides local control over EPLs 22 for diagnostic and other purposes in which local control is necessary. For this purpose, Hand-held EPL controller terminal 48 communicates with EPLs 22 through infra-red (IR) communication.

Host computer system 12 includes PLU storage medium 44 and transaction server 42.

Transaction server 42 handles price requests from POS terminal 20. POS terminal 20 sends item identification information to transaction server 42 and transaction server 42 returns the corresponding price from PLU data file 46.

PLU storage medium 44 stores PLU data file 46. PLU data file 46 is available for distribution to POS terminal 20. Provision may be made for direct access to PLU data file 46 by bar code reader 18.

Figure 2:
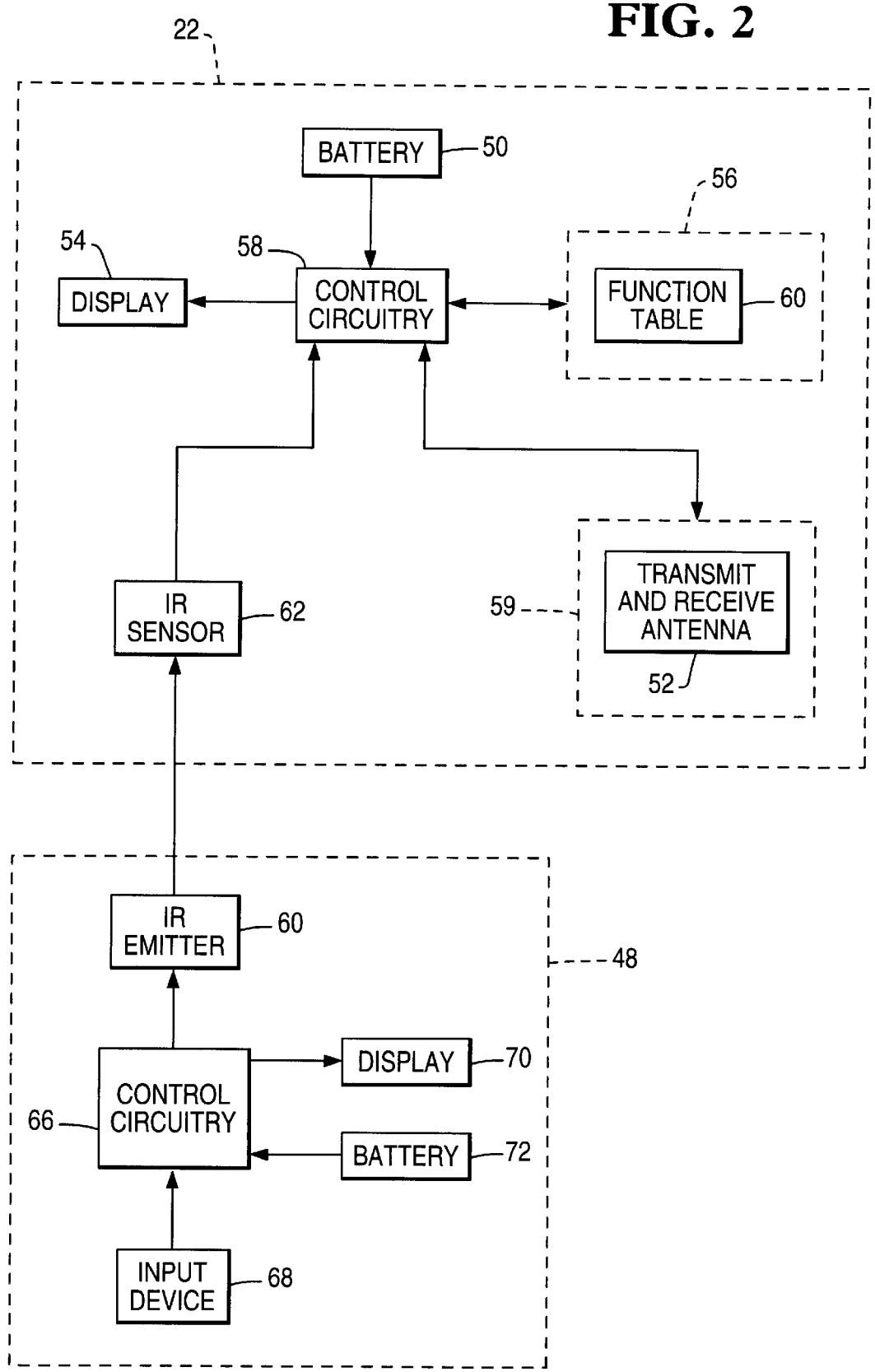
FIG. 2 is a block diagram of an EPL and a hand-held EPL controller.
Figure 3:
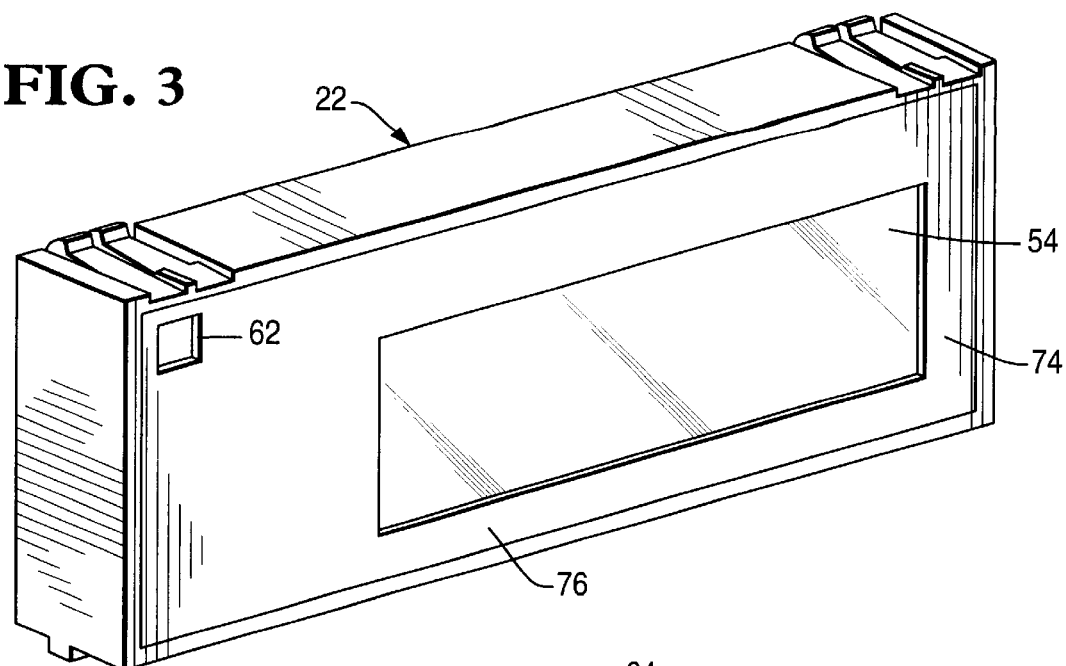
FIG. 3 is a perspective view of the EPL of FIG. 2.
Figure 4:
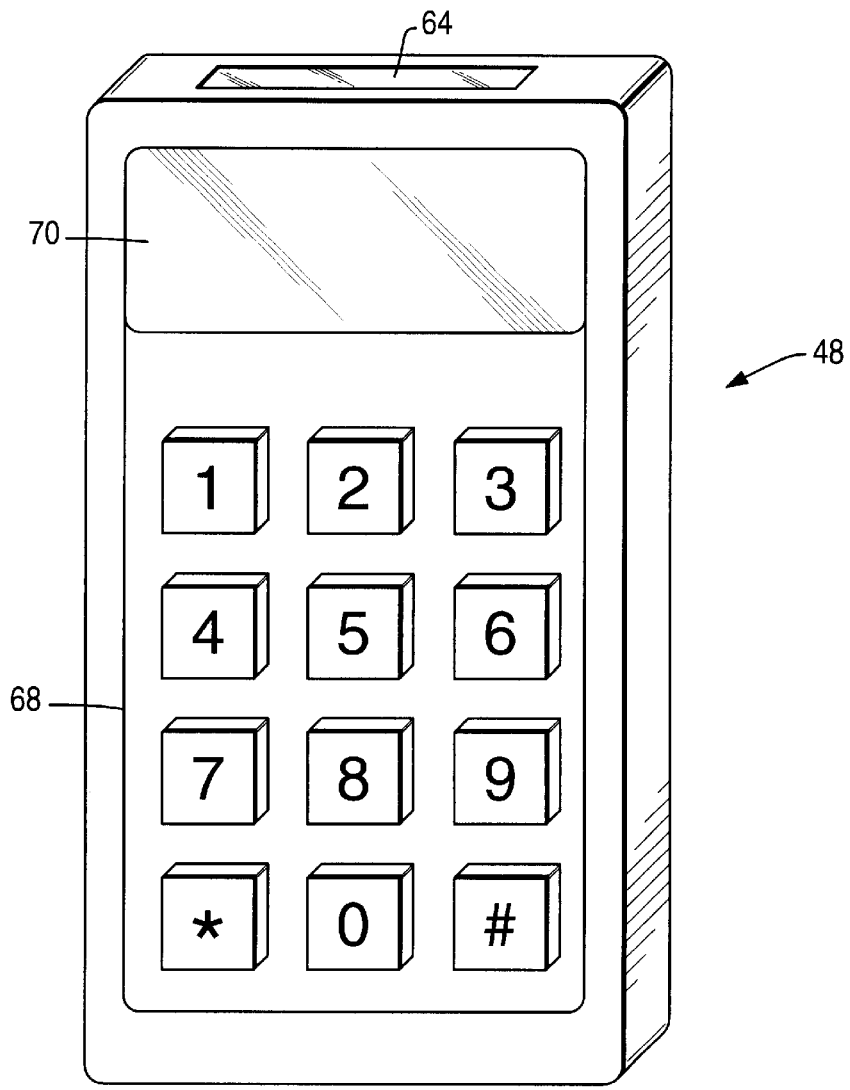
FIG. 4 is a perspective view of the EPL hand-held controller.

Turning now to FIGS. 2–4, EPL 22 includes battery 50, display 54, memory 56, control circuitry 58, RF communication circuitry 59, IR sensor 62, and housing 74.

Battery 50 provides power to EPL 22.

Display 54 displays prices and other information. Display 54 is preferably a liquid crystal display (LCD).

Memory 56 stores control instructions and information to be displayed. In particular, memory 56 stores function table 60, which includes a list of function codes and corresponding instructions executed by control circuitry 58 in response to IR signals containing the function codes from Hand-held EPL controller terminal 48. Control circuitry 58 receives function table 60 from EPL computer 24 using wireless RF communication.

Example control functions stored within function table 60 include toggling through and displaying register contents, displaying individual register contents, making certain register contents active, turning on special promotions, testing battery condition, testing LCD glass if display 54 is equipped with a wire conductor around its periphery and a continuity checker for testing the LCD glass for breakage, turning on special display symbols, and performing self-test diagnostics.

Control circuitry 58 controls operation of EPL 22. During normal operation, control circuitry 58 receives and executes commands from EPL computer 24 using wireless RF communication. During a local mode in which an operator is adjacent EPL 22, control circuitry 58 receives and executes commands from Hand-held EPL controller terminal 48.

RF communication circuitry 59 and transmit and receive antenna 52 allow EPL 22 to communicate with EPL computer 24.

IR sensor 62 senses IR emissions from Hand-held EPL controller terminal 48. With reference to FIG. 3, IR sensor 62 is preferably mounted in front surface 76.

Hand-held EPL controller terminal 48 includes IR emitter 64, control circuitry 66, input device 68, display 70, and battery 72.

IR emitter 64 emits IR energy in response to control signals from control circuitry 66.

Control circuitry 66 controls operation of Hand-held EPL controller terminal 48. In particular, control circuitry 66 causes IR emitter 64 to emit function codes to EPL 22.

Input device 68 records and initiates transmission of function codes in response to operator inputs. With reference to FIG. 4, input device 68 is preferably a keypad.

Display 70 displays function codes as they are recorded.

Battery 72 provides power to Hand-held EPL controller terminal 48.

During the local mode, the operator stands adjacent EPL 22 so that Hand-held EPL controller terminal 48 is within a line of sight of EPL 22. The operator inputs a function code and initiates emission of the function code by IR emitter 64 using input device 68.

Although the present invention has been described with particular reference to certain preferred embodiments thereof, variations and modifications of the present invention can be effected within the spirit and scope of the following claims.

I claim:

1. A method of controlling an electronic price label (EPL) comprising the steps of:

receiving a wireless radio frequency signal containing a function code and a corresponding instruction from a computer by control circuitry within the EPL;

storing the function code and the corresponding instruction in a memory within the EPL by the control circuitry;

receiving an infra-red signal containing the function code from a portable terminal by the control circuitry; and executing the corresponding instruction by the control circuitry.

2. The method as recited in claim 1, wherein the instruction comprises a command for viewing contents of a number of registers within the memory.

3. The method as recited in claim 1, wherein the instruction comprises a command for changing information displayed by the EPL.

4. The method as recited in claim 1, wherein the instruction comprises a diagnostic command.

5. A method of controlling an electronic price label (EPL) comprising the steps of:

receiving a wireless radio frequency signal containing a plurality of function codes and corresponding instructions from a computer by control circuitry within the EPL;

storing the function codes and the corresponding instructions in a memory within the EPL by the control circuitry;

receiving an infra-red signal containing one of the function codes from a portable terminal by the control circuitry;

determining the instruction which corresponds to the one function code by the control circuitry; and executing the instruction which corresponds to the one function code by the control circuitry.

6. An electronic price label (EPL) comprising:

a housing including an outer surface;

a memory within the housing which contains a number of function codes and corresponding instructions;

wireless radio frequency communication circuitry within the housing which receives radio frequency messages containing the functions codes and instructions from a computer;

infra-red communication circuitry including an infra-red sensor within the outer surface which receives infra-red signals containing at least one of the function codes from a portable terminal device; and control circuitry within the housing which stores the function codes and corresponding instructions in the memory, which determines the instructions associated with the function codes received from the portable terminal, and which executes the determined instructions.

7. An electronic price label (EPL) system comprising:
   a computer which transmits wireless radio frequency messages containing functions codes and instructions;
   a portable terminal which emits infra-red signals containing at least one of the function codes; and
   an EPL including;
      a housing including an outer surface;
      a memory within the housing which contains the function codes and instructions;
      wireless radio frequency communication circuitry within the housing which receives the radio frequency messages from the computer;
      infra-red communication circuitry including an infra-red sensor within the outer surface which receives the infra-red signals from the portable terminal; and
      control circuitry within the housing which stores the function codes and corresponding instructions in the memory, which determines the instructions associated with the function codes received from the portable terminal, and which executes the determined instructions.

8. A system for controlling an electronic price label (EPL) comprising:
   a computer which transmits wireless radio frequency messages containing functions codes and instructions; and
   a portable terminal which emits infra-red signals containing at least one of the function codes;
   wherein the EPL receives the radio frequency messages, stores the function codes and corresponding instructions in a memory within the EPL, receives the infra-red signals from the portable terminal, determines the instructions associated with the function codes received from the portable terminal, and executes the determined instructions.

* * * * *